United States Patent
Brandriff

[11] Patent Number: 5,859,121
[45] Date of Patent: Jan. 12, 1999

[54] CONCENTRATED AQUEOUS EO/PO NONIONIC BLOCK COPOLYMER SOLUTION

[75] Inventor: John W. Brandriff, Blue Springs, Mo.

[73] Assignee: Bayer Corporation, Pittsburgh, Pa.

[21] Appl. No.: 896,230

[22] Filed: Jul. 17, 1997

Related U.S. Application Data

[63] Continuation of Ser. No. 502,440, Jul. 14, 1995, abandoned.
[51] Int. Cl.$^6$ .............................. C08L 71/02; C08K 5/06
[52] U.S. Cl. ...................... 524/505; 524/376; 524/377; 524/346; 524/604
[58] Field of Search .................................... 524/505, 377, 524/376, 346, 604, 903; 568/601

[56] References Cited

U.S. PATENT DOCUMENTS 5,480,928  1/1996  Stratta et al. .......................... 524/386

Primary Examiner—James J. Seidleck
Assistant Examiner—Olga Asinovsky
Attorney, Agent, or Firm—Joseph C. Gil; Godfied R. Akorli; Carol Marmo

[57] ABSTRACT

Disclosed herein is a stable aqueous dispersant solution containing a high concentration of an EO/PO nonionic block copolymer incapable of liquid phase continuity at ambient temperatures, and a formulation and processing approach providing an effective combination of an anionic dispersant with a water miscible solvent in an aqueous system that allows the feasible production of a dispersant solution containing a high concentration of EO/PO nonionic block copolymer.

10 Claims, No Drawings

CONCENTRATED AQUEOUS EO/PO NONIONIC BLOCK COPOLYMER SOLUTION

This application is a continuation, of application Ser. No. 08/502,440 filed Jul. 14, 1995, now abandoned.

BACKGROUND OF THE INVENTION

1. Field of the Invention

The present invention relates to an aqueous dispersant solution. More specifically, the invention relates to a stable aqueous dispersant solution containing elevated levels of ethylene oxide/propylene oxide (EO/PO) nonionic block copolymer, and methods of making, and using the same. The dispersant solutions are particularly useful in the production of suspension concentrates, solid/liquid dispersions, or emulsions.

2. Brief Description of the Prior Art

Suspension concentrates of particles in an aqueous medium are generally known in the art. Also generally known are dispersants that are used to stabilize the suspension concentrates. Anionic dispersants, for example, promote stability by increasing the electrostatic repulsion forces of the particles. Nonionic block copolymer dispersants promote stability by steric means by forming around the particles' physical barriers that keep them separated and prevent agglomeration from inter particle collisions. Of interest here are suspension concentrates containing nonionic block copolymer dispersants in the form of waxy pastes that melt at 30° to 50° C., resolidify rapidly on contact with their container and other contents of the container at ambient temperatures, and then dissolve very slowly. Illustratively, the nonionic block copolymer would resolidify on contact with water and surfaces such as pipelines and agitating blades, and then dissolve rather slowly in water.

This apparent incompatibility of the nonionic block copolymers compels formulators to prepare pre-formulated solutions of the nonionic block copolymer dispersants. The nonionic block copolymer dispersant is pre-formulated with a water-miscible solvent before it is added to formulation process streams operating at ambient temperatures. However, the maximum concentration of nonionic block copolymer in this pre-formulated solution has been about ten percent. Above the ten percent concentration, the pre-formulated solution generally encounters problems such as unduly high viscosity at ambient temperature, and/or a rapid cloud point transformation to a solid gel structure when the solution is heated.

There is, therefore, a need for both formulation and production processing approaches that will feasibly provide a pre-formulated aqueous dispersant solution that contains a higher concentration of nonionic block copolymer. The present invention provides a formulation approach that achieves the target EO/PO nonionic block copolymer concentration of twenty percent and higher, and a feasible process for preparing and using the same.

SUMMARY OF THE INVENTION

In accordance with the foregoing, the present invention encompasses a stable aqueous dispersant solution containing a high concentration of an EO/PO nonionic block copolymer incapable of liquid phase continuity at ambient temperatures and an effective combination of an anionic dispersant with a water-miscible solvent to provide the high concentration of the nonionic block copolymer in the dispersant solution.

Surprisingly, it has been found that by using the effective combination of the anionic dispersant and the water-miscible solvent, one can increase the concentration of the nonionic block copolymer in the dispersant solution without encountering the art-associated problems of cloud point transformation to a solid gel structure at high temperatures, or the unduly high solution viscosity at ambient temperature.

In the presently preferred embodiment of the invention, one can prepare a stable, fluid aqueous dispersant solution having a nonionic block copolymer in a concentration of about twenty percent. The increased concentration cuts the production volume of pre-formulated dispersant solution required for a given suspension concentrate in half. This results in substantial reductions in material handling, transportation, storage, and labor costs, and minimizes potential disruptions in production from scheduling conflicts or overuse of existing plant production capacities.

The following definitions are provided to enable the skilled artisan to ascertain, make and use the claimed invention. By the term "water-based" or "aqueous" is meant a solution with water as a solvent. By the term "nonionic block copolymer" is meant a compound generally used as a dispersant (surfactant) containing a central polyoxypropylene group with a molecular weight which is typically equal to or greater than 2,000, "sandwiched" between two polyoxyethylene groups that have been adjusted in length to constitute a combined weight percentage of over 25% of the total molecular weight. The "EO/PO nonionic block copolymer," is characterized by the structural arrangement of EO-PO-EO. The physical form of the nonionic block copolymer is a solid, waxy paste that melts at 30° C. to 50° C. The hydrophilic/lipophilic balance (HLB) values for the nonionic block copolymer is about 10 to 20. By the term "incapable of liquid phase continuity at ambient temperature" is meant that the nonionic block copolymer is in the form of a solid, waxy paste that will not form a continuous phase with a liquid medium. To form a continuous phase with a liquid medium, the nonionic block copolymer can be melted, but it would resolidify at ambient temperature and dissolve rather slowly in an aqueous medium. By the term "effective combination" is meant the combination of the anionic dispersant and the water miscible solvent that allows the increase in the concentration of the nonionic block copolymer in the dispersant solution. By these and other terms, the invention is described more fully as follows.

DETAILED DESCRIPTION OF THE INVENTION

As set forth above, the present invention comprises a stable aqueous dispersant solution containing a high concentration of an EO/PO nonionic block copolymer, and an effective combination of an anionic dispersant and a water-miscible solvent. The dispersant solution is useful as a physically stable source of anionic dispersant and nonionic block copolymer. More specifically, the dispersant solution is useful in stabilizing suspend finely ground solid particles in a water-based fluid medium of suspension concentrates.

The nonionic block copolymer that is used herein is characterized as being incapable of liquid phase continuity at ambient temperatures. Typically, the nonionic block copolymer is provided as a solid, waxy paste. In this form, the paste does not form a continuous phase with a liquid medium. To form a continuous phase with a liquid medium, the nonionic block copolymer is melted at about 50° to 70° C., but resolidifies at ambient temperatures. The following is a more specific but non-limiting description of the nonionic block copolymers that are useful herein. Structurally, the nonionic block copolymers are characterized by an EO-PO-EO arrangement. They have a hydrophobe (PO) having molecular weight which is typically about 2,000 or higher. They have a total hydrophile (EO) content of about 25% or higher of the total molecular weight. The hydrophilic/lipophilic balance (HLB) of the nonionic block copolymers is about 10 or higher. The following is a more specific but non-limiting description of the nonionic block copolymers that are useful herein. These nonionic block copolymers also have the structural arrangement of EO-PO-EO; a PO molecular weight of about 3,000 to 3,500; an EO content of about 30% to 50% and preferably about 30% to 40% of the total molecular weight; an HLB range of about 12 to 18, and are in the form of a waxy paste at ambient temperatures. The choice of a particular nonionic block copolymer depends on the specific performance needs of the final suspension concentrate that will contain this dispersant solution. In accordance with this invention, the nonionic block copolymer can be employed in a concentration higher than 10% to about 30% and preferably about 15% to 30%, and more preferably about 20% to 25% by weight based on the total weight of the solution.

The effective combination of the anionic dispersant and the water-miscible solvent is such as would provide an increased concentration of the nonionic block copolymer in a stable aqueous dispersant solution. Illustrative but non-limiting examples of the anionic dispersant can be selected from the group consisting of sodium lignosulfonates, sodium naphthalene sulfonates, diphenyl oxide disulfonates, condensed naphthalene sulfonic acids, and alkyl aryl sulfonates. The choice of a particular anionic dispersant depends on the specific performance needs of the final suspension concentrate that will contain this dispersant solution (amounts of about 10% to 20% by weight). Preferably, the amount should meet but not exceed the correct proportion of use of the anionic dispersant in the final suspension concentrate, solid/liquid dispersions, or emulsions.

As the water-miscible solvent, one can employ a member selected from the group of polyhydric alcohols that are typically used to produce final suspension concentrates, solid/liquid dispersants or emulsions. The particular solvent to be used depends on the desired performance characteristics in the final product. Preferably, the water-miscible solvent is employed in an amount of about 20% to 40% by weight based on the total weight of the dispersant solution. The percentage of water-miscible solvent to be used will depend on the lubricity and viscosity of the chosen solvent. Low viscosity solvents will be used in higher percentages, and high viscosity solvents will be used in lower percentages. Typically, the water miscible solvent and the anionic dispersant are added in ratios ranging from about 1:1 to 2:1.

In the method of preparing the solution dispersant, an aqueous base solution of the anionic dispersant and the water-miscible solvent is first prepared and the nonionic block copolymer is then introduced therein under heated conditions. The aqueous base solution can be prepared by mixing the water-miscible solvent, water, and anionic dispersant. The following is a more specific but non-limiting description of a method of preparing the aqueous base solution. First, hot water circulation is started through the reactor jacket. (Target product temperature is 55° C., ±5° C.2) The selected water miscible solvent and one-half of the water are then charged to the reactor. If trace components are desired, they can be added at this time. Agitation of the reactor contents is started and the anionic dispersant is charged to the reactor, at a slow enough rate to avoid surface build-up of powder. Time is allowed between additions for any powder to disperse from the surface. It is recommended that one should avoid creating a vortex or excess splashing, as severe aeration may result therefrom. Once the anionic dispersant charge is complete, the remaining water is charged and blended for 15 minutes while bringing the solution temperature up to 55° C. ±5° C.

The resulting base solution disperses and dissolves the molten nonionic block copolymer into a fluid, stable solution. Before addition to the base solution described above, the nonionic block copolymer is melted at a temperature of 70° C., ±10° C. The following is more specific but non-limiting description of a method of incorporating the molten nonionic block copolymer into the base solution. A portion of the heated base solution is passed through pumps and transfer lines to be used to deliver the molten nonionic block copolymer to the reactor. This will prevent pluggage from "freezing" of the molten copolymer in lines or pumps at ambient temperatures. The molten block copolymer is pumped into the reactor, under agitation. Transfer lines can be post flushed with the base solution or the finished dispersant solution. Batch dispersant solutions are preferably blended and circulated for about thirty minutes.

The resulting aqueous dispersant solution remains stable and fluid, and maintains the nonionic block copolymer in solution, at ambient and expected storage temperatures. The mean dispersant solution viscosity is about 300 to 500 and preferably about 400 centipoise. The finished dispersant solution is readily combined into the suspension concentrate, dispersion, or emulsion.

It is a feature of the invention that when introduced into the base solution under heated conditions, the nonionic block copolymer does not induce the rapid cloud point transformation to a solid gel structure under heated conditions, nor does it resolidify or cause unduly high viscosity at ambient temperatures. It is also a feature of the invention that, if the molten nonionic block copolymer must be pumped through unheated transfer lines to the process, the heated aqueous base solution can be used to flush the transfer pump and lines before and after the transfer. This prevents pluggage from solidification of the molten nonionic block copolymer in the pump and/or transfer lines.

As would be realized, the high concentration of the aqueous dispersant solution would enable the reduction in processing and material handling costs, and would minimize disruptions to plant production schedules by reducing the required production volumes of aqueous dispersant solution. In the presently preferred embodiment of the invention, production volumes can be reduced to half the amount required under prior art. Illustratively, for a product with a formula requirement of 3% EO/PO nonionic block copolymer, the amount of aqueous dispersant solution required for the production of 200,000 gallons of finished product could be reduced from about 60,000 to 30,000 gallons by increasing the nonionic block copolymer concentration from the state of the art concentration of about 10% to the high concentration of about 20%.

The invention will be described further in the following examples wherein all parts are by weight unless otherwise expressed.

EXAMPLES

| Ingredients | Parts by weight | Description of Process Conditions |
| --- | --- | --- |
| Water | 20 | Heating to target temp. of 55° C. ± 5° C. |
| 1,2,3-propanetriol | 20 | Reactor agitation was started |
| Condensed naphthalene sulfonic acid | 20 | Charged slowly and allowed to disperse and dissolve. Vortex and splashing minimized to minimize batch aeration. |
| Water | 20 | Agitation, temp. adjusted to ~55° C. |
| EO/PO nonionic block copolymer | 20 | Melted at 70° C. ± 10° C., charged slowly to mixing vessel. Blended fifteen minutes. |
| Total Parts | 100 | |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stable aqueous dispersant solution comprising from greater than 10% to about 30% by weight of an EO/PO nonionic block copolymer which is incapable of liquid phase continuity at ambient temperatures, and a combination of an anionic dispersant with a water-miscible solvent having a molar ratio of anionic dispersant to water-miscible solvent of from about 1:1 to about 1:2, wherein the anionic dispersant is selected from the group consisting of sodium lignosulfonates, sodium naphthalene sulfonates, diphenyl oxide disulfonates, condensed naphthalene sulfonic acids, and alkyl aryl sulfonates.

2. The composition of claim 1 wherein the nonionic block copolymer is a polyoxypropylene-polyoxyethylene nonionic block copolymers with a structural arrangement of EO-PO-EO.

3. The composition of claim 1 wherein the nonionic block copolymer is present in an amount of about 15% to 25%.

4. The composition of claim 1 wherein the anionic dispersant is condensed naphthalene sulfonic acid.

5. The composition of claim 1 wherein the anionic dispersant is present in an amount of about 10% to 30%.

6. The composition of claim 5 wherein the anionic dispersant is present in an amount of about 15% to 25%.

7. The composition of claim 1 wherein the water-miscible solvent is a polyhydric alcohol.

8. The composition of claim 7 wherein the water-miscible solvent is 1,2,3-propanetriol.

9. The composition of claim 1 wherein the water-miscible solvent is present in an amount of about 10% to 40%.

10. A method of preparing a stable aqueous dispersant solution comprising from greater than 10% to about 30% by weight of an EO/PO nonionic block copolymer which is incapable of liquid phase continuity at ambient temperatures comprising mixing the nonionic block copolymer with a combination of an anionic dispersant and a water-miscible solvent under heated conditions, the combination having a molar ratio of anionic dispersant to water-miscible solvent of from about 1:1 to about 1:2, wherein the anionic dispersant is selected from the group consisting of sodium lignosulfonates, sodium naphthalene sulfonates, diphenyl oxide disulfonates, condensed naphthalene sulfonic acids, and alkyl aryl sulfonates.

* * * * *